(12) United States Patent
Rhyu et al.

(10) Patent No.: US 11,888,687 B2
(45) Date of Patent: Jan. 30, 2024

(54) METHOD FOR PROVISIONING INSTANCE IN COMMUNICATION SYSTEM SUPPORTING MULTIPLE ARCHITECTURES

(71) Applicant: Samsung Electronics Co., Ltd., Suwon-si (KR)

(72) Inventors: Sungryeul Rhyu, Suwon-si (KR); Hyunkoo Yang, Suwon-si (KR); Hakju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/706,294

(22) Filed: Mar. 28, 2022

(65) Prior Publication Data

US 2022/0321407 A1 Oct. 6, 2022

(30) Foreign Application Priority Data

Mar. 30, 2021 (KR) .......................... 10-2021-0041200

(51) Int. Cl.
| | |
|---|---|
| *H04L 41/0813* | (2022.01) |
| *H04L 67/51* | (2022.01) |
| *H04L 67/2866* | (2022.01) |
| *H04L 67/143* | (2022.01) |
| *H04L 67/146* | (2022.01) |

(52) U.S. Cl.
CPC ........ *H04L 41/0813* (2013.01); *H04L 67/143* (2013.01); *H04L 67/146* (2013.01); *H04L 67/2866* (2013.01); *H04L 67/51* (2022.05)

(58) Field of Classification Search
CPC .... H04L 41/0813; H04L 67/143; H04L 67/51
USPC .......................................................... 709/221
See application file for complete search history.

(56) References Cited

U.S. PATENT DOCUMENTS

| | | | |
|---|---|---|---|
| 9,087,319 B2 | 7/2015 | Nguyen | |
| 2017/0141973 A1* | 5/2017 | Vrzic | .................... H04W 76/11 |
| 2020/0059809 A1 | 2/2020 | Rahman et al. | |
| 2020/0344274 A1 | 10/2020 | Jahangir et al. | |

FOREIGN PATENT DOCUMENTS

| | | |
|---|---|---|
| KR | 10-2022-0001312 A | 1/2022 |
| WO | 2019060758 A1 | 3/2019 |

OTHER PUBLICATIONS

Dryjanski, 5G Core Network—a Short Overview, May 6, 2017, www.grandmetric.com. https://www.grandmetric.com/5g-core-network-a-short-overview/ (Year: 2017).*

(Continued)

*Primary Examiner* — Zi Ye

(57) ABSTRACT

The disclosure relates to a 5G or 6G communication system for supporting a higher data transmission rate. A method of operating a management service (MnS) in a communication system supporting a plurality of architectures according to an embodiment of the present disclosure includes identifying an architecture supported by a first instance which is running and a list of functions for the architecture, determining whether to use the first instance based on a result of the identification and a requirement for service provision, and terminating the first instance and generating a second instance in case that the MnS determines not to use the first instance.

16 Claims, 10 Drawing Sheets

(56) References Cited

OTHER PUBLICATIONS

Desiniotis, EdgeAP: Enabling Edge Computing on Wireless Access Points, Jun. 7, 2020, Santa Clara University, https://scholarcommons.scu.edu/cgi/viewcontent.cgi?article=1064&context=idp_senior (Year: 2020).*

International Search Report and Written Opinion of the International Searching Authority dated Jun. 17, 2022, in connection with International Application No. PCT/KR2022/004137, 6 pages.

ETSI TS 128 533 V16.5.1 (Nov. 2020), 5G; Management and orchestration; Architecture framework (3GPP TS 28.533 version 16.5.1 Release 16), Nov. 2020, 33 pages.

* cited by examiner

| Parameters | Description |
|---|---|
| Provisioning Session identifier | Unique identification of the M 1d Provisioning Session. |
| Functionality add-ons | Identification of the list of added functinoalties from different architecture/functionalities. E.g., 3gpp:sa6:edgeapp-ees, 3gpp:sa4:5mbs:xxx |

FIG.2

| Parameters | Description |
|---|---|
| Server address | 5GMSd AF address that offers the APIs for 5GMSd AF-based Network Assistance, accessed by the 5GMSd Media Session Handler. The server address shall be an opaque URL, following the 5GMS URL format. |
| EES Server address | EES address that offers the APIs for EdgeApp EES-based requests. |

FIG.3

| Endpoint | Instance ID | PID | Supported functions | Type |
|---|---|---|---|---|
| xx.xx.xx | 1 | 100 | AF | EMSA EEAF |
| xx.xx.xx | 1 | 101 | EES | EMSA EEAF |
| xx.xx.xy | 2 | 102 | EES | EdgeApp EES |
| xx.xx.xz | 3 | 103 | AF, EES | EMSA EEAF |

FIG.6

METHOD FOR PROVISIONING INSTANCE IN COMMUNICATION SYSTEM SUPPORTING MULTIPLE ARCHITECTURES

CROSS-REFERENCE TO RELATED APPLICATION

This application is based on and claims priority under 35 U.S.C. § 119 to Korean Patent Application No. 10-2021-0041200, filed on Mar. 30, 2021, in the Korean Intellectual Property Office, the disclosure of which is herein incorporated by reference in its entirety.

BACKGROUND

1. Field

The disclosure relates to a method for identifying an entity supporting two or more architectures in a communication system, and supporting one or multiple functions corresponding to each of a plurality of architectures by the one entity.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The conventional media streaming architecture may store contents provisioned from a content provider in a server, and transmit the corresponding contents after establishing a session according to a client's access request.

The conventional edge architecture may receive a process execution request from an application provider according to a client's processing request, instantiate an edge server instance, instruct the edge server instance to execute a process, and transmit the result to the client.

Recently, a hybrid system architecture that provides media using edge processing is under discussion. In the hybrid system architecture, an instance in charge of one function of the media streaming architecture may also serve as one function of the edge architecture. However, since some instances may provide only the media streaming architecture, there should be provided a new identification method for determining a communication method according to the system architecture supported by the counterpart entity when communicating between entities in the hybrid system architecture.

SUMMARY

The disclosure provides a method for identifying one entity supporting two or more architectures in a communication system, and supporting one or a plurality of functions corresponding to each of the plurality of architectures by the one entity.

According to an embodiment of the disclosure, a method of operating a management service (MnS) in a communication system supporting a plurality of architectures may include identifying an architecture supported by a first instance which is running and a list of functions for the architecture, determining whether to use the first instance based on a result of the identification and a requirement for service provision, and terminating the first instance and generating a second instance in case that the MnS determines not to use the first instance.

According to an embodiment of the disclosure, a method for identifying a function supported by an instance may include identifying whether a second architecture is supported in a instance which is running based on a first architecture, instantiating, if not supported, a new instance supporting the second architecture, identifying whether the second architecture is supported, a process type required by a client is supported and instantiating a new instance if not supported, and identifying whether the second architecture and the process type required by the client are supported, a process capability required by the client is supported and instantiating a new instance.

According to an embodiment of the disclosure, a network device in a communication system supporting a plurality of architectures may include a transceiver, and a controller connected to the transceiver and controlling the transceiver. The controller may be configured to identify an architecture supported by a first instance which is running and a list of functions for the architecture, determine whether to use the first instance based on a result of the identification and a requirement for service provision, and terminate the first instance and generate a second instance in case that the MnS determines not to use the first instance.

A method and device according to an embodiment of the disclosure may identify one instance supporting two or more architectures in a communication system and effectively provision a function for each architecture.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 2 illustrates parameters of baseline service access information according to an embodiment of the present disclosure.

FIG. 3 illustrates parameters for a 5GMSd AF-based network assistance configuration according to an embodiment of the present disclosure.

FIG. 6 illustrates a look up table (LUT) according to an embodiment of the present disclosure.

DETAILED DESCRIPTION

Figure 1:
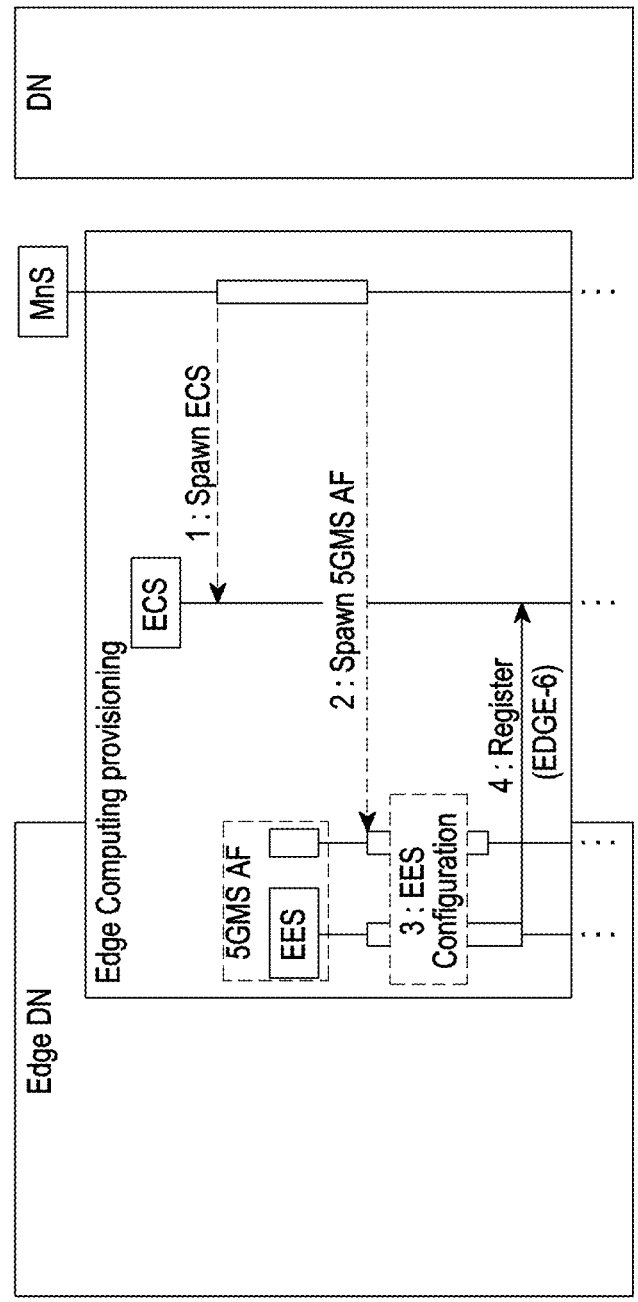
FIG. 1 illustrates a hybrid system in which an edge architecture and a media streaming architecture are used together according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In the following description of the disclosure, if it is determined that a detailed description of related well-known functions or configurations may unnecessarily obscure the gist of the disclosure, the detailed description thereof will be omitted. In addition, the terms to be described later are terms defined in consideration of functions in the disclosure, which may vary according to intentions or customs of users and operators. Therefore, the definition should be made based on the content throughout this specification.

A term for identifying an access node, a term referring to network entities, a term referring to messages, a term referring to an interface between network entities, a term referring to various identification information and the like, which are used in the following description, are exemplified for convenience of description. Therefore, the disclosure is not limited to the terms described below, and other terms referring to objects having equivalent technical meanings may be used.

For convenience of description below, the disclosure uses terms and names defined in the standard for a 5G system. However, the disclosure is not limited by the terms and names, and may be equally applied to the systems according to other standards.

According to an embodiment of the disclosure, a method for identifying a function supported by an instance may include an operation of identifying whether a corresponding instance supports a second system architecture by communicating with an instance belonging to a first system based on a communication method of a first system architecture, in a system for provisioning a service based on a function, in a functional entity operating on the system, and in a data structure (hereinafter, a system architecture) exchanged between functional entities. According to an embodiment, if the corresponding instance supports the second system architecture, it may be identified whether the corresponding instance supports any function list of the second system architecture.

According to an embodiment, if the corresponding instance does not support the second system architecture, the corresponding instance may be replaced with an instance supporting the second system architecture, or a process supporting the second system architecture may be attached as a child process of the corresponding instance.

According to an embodiment, if the corresponding instance supports the second system architecture, it may be determined whether the corresponding instance supports the new requirements or whether the corresponding instance supports the increased requirements.

According to an embodiment, when determining whether the corresponding instance supports the new requirements or whether the corresponding instance supports the increased requirements, if it is determined that the corresponding instance does not support the new requirements or is insufficient to support the increased requirements, a new instance may be created.

An embodiment of the disclosure provides a method of identifying, when one instance supports two or more architectures, the supported architecture and a function of the architecture.

The entities, instances, processes, and functions used in the disclosure may have the following meanings. The entity may be implemented in a computer program (e.g., an Internet browser), and as to the instance, a plurality of instances may be created at the same time and implemented to perform different roles (e.g., opening two browser windows to open different sites). As to the process, one or more processes may be created to handle functional requirements that depend on one instance (e.g., a process of running videos on a site, a process of handling keyboard input, etc.).

A management service (MnS) used in the disclosure may be implemented as an operating system (OS) of a computer or a task manager which is a user interface (UI) representing the same. An endpoint may refer to an address used by an OS of a computer to communicate with an instance or process.

FIG. 1 illustrates a hybrid system in which an edge architecture and a media streaming architecture are used together according to an embodiment of the present disclosure. FIG. 1 shows a preparation process for service provision in a hybrid system in which an edge architecture and a media streaming architecture are used together in a $3^{rd}$ generation partnership project (3GPP) 5G communication system.

In the hybrid system, a service provision preparation process may be initiated by 3GPP MnS (management service). FIG. 1 shows a process in which the MnS instantiates instances for an edge configuration server (ECS) of an edge architecture and a 5G media streaming (5GMS) application function (AF) of a media streaming architecture. FIG. 1 illustrates the MnS, the ECS and edge enabler server (EES) operating as an entity of the edge architecture, and the 5GMS AF operating as an entity of the media streaming architecture.

According to an embodiment, the MnS may create an instance of the ECS for managing the EES of the edge architecture. The MnS may then create an EES of the edge architecture.

When creating the EES of the edge architecture, the MnS may identify whether an instance corresponding to the AF of the media streaming architecture also serves as a function of the EES. Since the MnS operates on the premise of a hybrid system, if the AF, which is an entity of the first system architecture, also serves as the EES, which is an entity of the second system architecture, the MnS does not need to create a new instance to handle the EES function.

The disclosure provides a method for identifying whether an instance of the first system architecture also serves as a function of an entity of the second system architecture. A method for determining whether the MnS provides the EES function of the AF instance is provided as an embodiment of the disclosure, as follows.

FIG. 2 illustrates parameters of baseline service access information according to an embodiment of the present disclosure.

According to an embodiment of the disclosure, the AF may provide a functionality add-on list as shown in FIG. 2, as a new information element. The functionality add-on is a list of functions provided by the AF instance, and the corresponding function list may be a list consisting of functions of the second system architecture, or the third and fourth system architectures.

According to an embodiment, the functionality add-on information element may be included in an information field returned by the AF, such as server access information (SAI), or may be included in other information fields. Each entry in the function list may be in the form of a uniform resource name (URN) that can represent a system and a function, such as 3gpp:sa6:edgeapp:ees, and the corresponding list may be included not only in the functionality add-on information element but also in the conventional identifier item, for example, a provisioning session identifier.

FIG. 3 illustrates parameters for a 5GMSd AF-based network assistance configuration according to an embodiment of the present disclosure.

According to an embodiment of the disclosure, the AF may explicitly provide EES server address information as shown in FIG. 3 as a new information element for the EES only. The EES server address may provide an endpoint of an API that provides a function of the EES, and the corresponding endpoint may be the same as the endpoint of the AF instance. According to an embodiment, the endpoint provided by the EES server address may be different from the endpoint of the AF instance.

The AF according to an embodiment of the disclosure may explicitly provide an instance address list for each associated entity, when other entities of the first system architecture, i.e., application server (AS), media session handler (MSH), media player, 5G-aware application, etc. also serve as other entities of the second system architecture, i.e., edge application server (EAS), edge enabler client (EEC), application client (AC), etc.

According to an embodiment of the disclosure, when the information element shown in FIG. 2 or FIG. 3 is returned, the MnS may determine whether the EES, which is an entity of the second system architecture, is included in the AF, which is an entity of the first system architecture.

According to an embodiment of the disclosure, the MnS may manage the list of created instances and processes.

Figure 4:
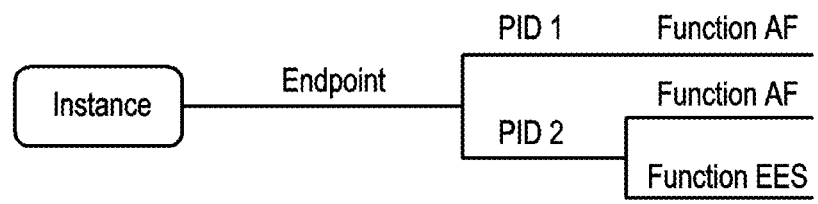
FIG. 4 illustrates an instance according to an embodiment of the present disclosure.
Figure 5:
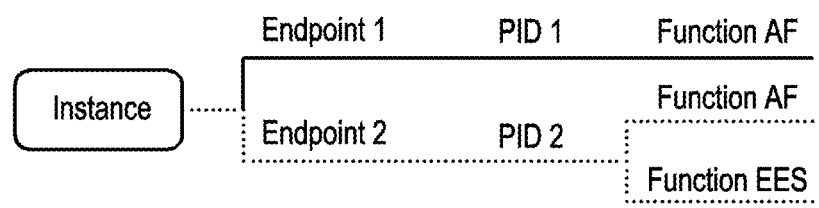
FIG. 5 illustrates an instance according to another embodiment of the present disclosure.

FIG. 4 illustrates an instance according to an embodiment of the disclosure, and FIG. 5 illustrates an instance according to another embodiment of the present disclosure.

As shown in FIG. 4 and FIG. 5, one entity may have one or more instances, and each instance may have one or more processes. An endpoint may be given per instance or per process, and a process may provide one or more functions.

Referring to FIG. 4, one endpoint may be allocated to one instance, and a first process identifier (PID 1) and a second process identifier (PID 2) may be associated with one endpoint. Here, the first process identifier (PID 1) may provide a function AF, and the second process identifier (PID 2) may provide a function AF and a function EES.

Referring to FIG. 5, a first endpoint (Endpoint 1) and a second endpoint (Endpoint 2) may be assigned to one instance. The first process identifier (PID 1) may be associated with the first endpoint (Endpoint 1), and the second process identifier (PID 2) may be associated with the second endpoint (Endpoint 2). Here, the first process identifier (PID 1) may provide a function AF, and the second process identifier (PID 2) may provide a function AF and a function EES.

FIG. 6 illustrates a look up table (LUT) according to an embodiment of the present disclosure.

Since the MnS is involved in the creation and operation of instances and processes, the MnS according to an embodiment of the disclosure may manage instances and processes as a look up table (LUT) list after the creation of the instances and processes, and may use the LUT upon external request or when necessary, according to the operation of the MnS.

According to an embodiment of the disclosure, the LUT of the MnS may provide, for each endpoint, an instance identifier (instance ID), a process identifier (PID), a list of provided functions (supported functions), and an entity type (e.g., a list with one entry for each entity type in the first system architecture, the second system architecture, or the hybrid system architecture) in the system architecture, as shown in FIG. 6.

According to an embodiment of the disclosure, the MnS may search the LUT for the corresponding instance or process based on the endpoint, and may identify (or know) a list of supported functions of the instance or process with the corresponding endpoint. Based on this information, the MnS may determine whether it is necessary to create an additional instance/process, which will be described later.

Figure 7:
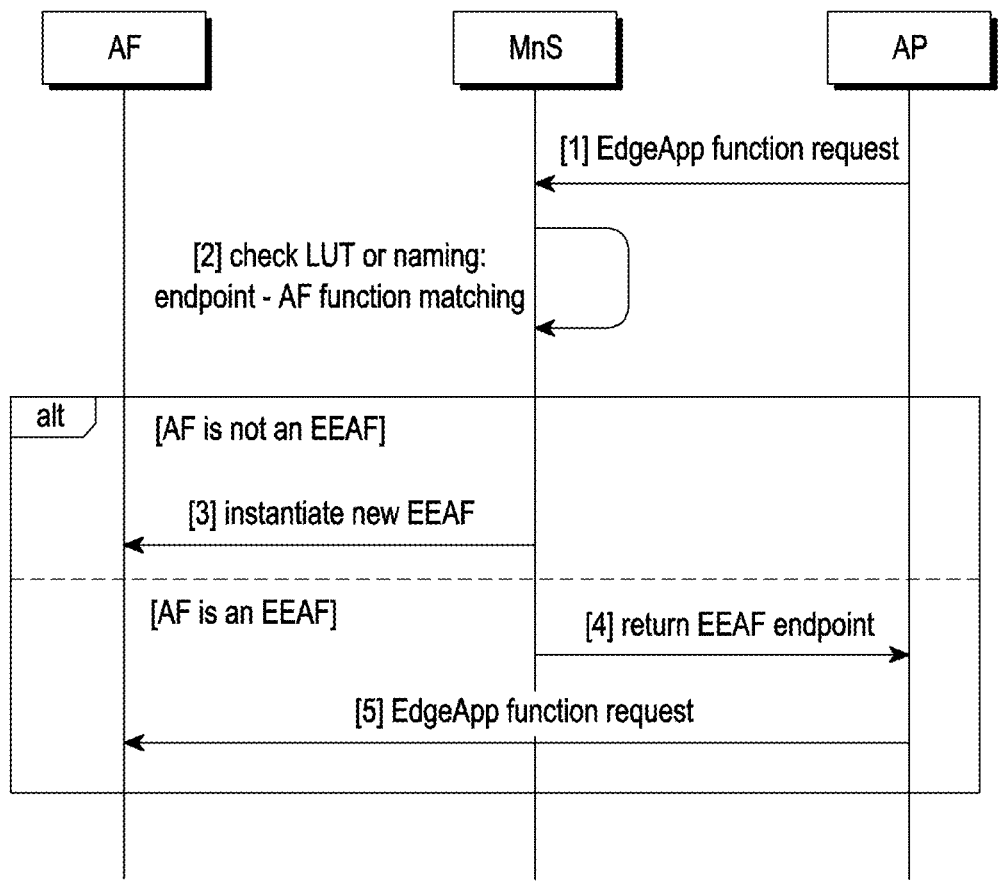
FIG. 7 is a flowchart illustrating a process of identifying an edge enabled AF (EEAF) using a LUT according to an embodiment of the present disclosure.

FIG. 7 is a flowchart illustrating a process of identifying an edge enabled AF (EEAF) using a LUT according to an embodiment of the present disclosure.

Referring to FIG. 7, in operation [1], the MnS may receive an edge architecture function use request (EdgeApp function request) from the AP or the outside. In operation [2], the MnS may check the LUT to identify whether a pre-registered AF is the edge enabled AF (EEAF), which is an instance of a hybrid system architecture between the media streaming architecture, which is the first system architecture, and the edge architecture, which is the second system architecture.

If it is identified in operation [2] that the AF is not the EEAF, the MnS may create a new EEAF instance and transmit the new EEAF instance to the AF in operation [3] (instantiate a new EEAF). If it is identified in operation [2] that the AF is the EEAF, the MnS may return an endpoint of the EEAF to the AF in operation [4] (return the EEAF endpoint), and the AP may request a function of the edge architecture from the AF (i.e., EEAF) in operation [5] (EdgeApp function request).

According to an embodiment of the present disclosure, the MnS may create a new instance according to the LUT identification result as shown in FIG. 7. The MnS may create an instance or process capable of performing a requested function. According to an embodiment, if an instance that supports only the first system architecture exists in the current system, the MnS may terminate the corresponding instance and create an instance supporting one or more other systems, or may attach a process supporting one or more other systems to an instance supporting only the first system architecture.

Figure 8:
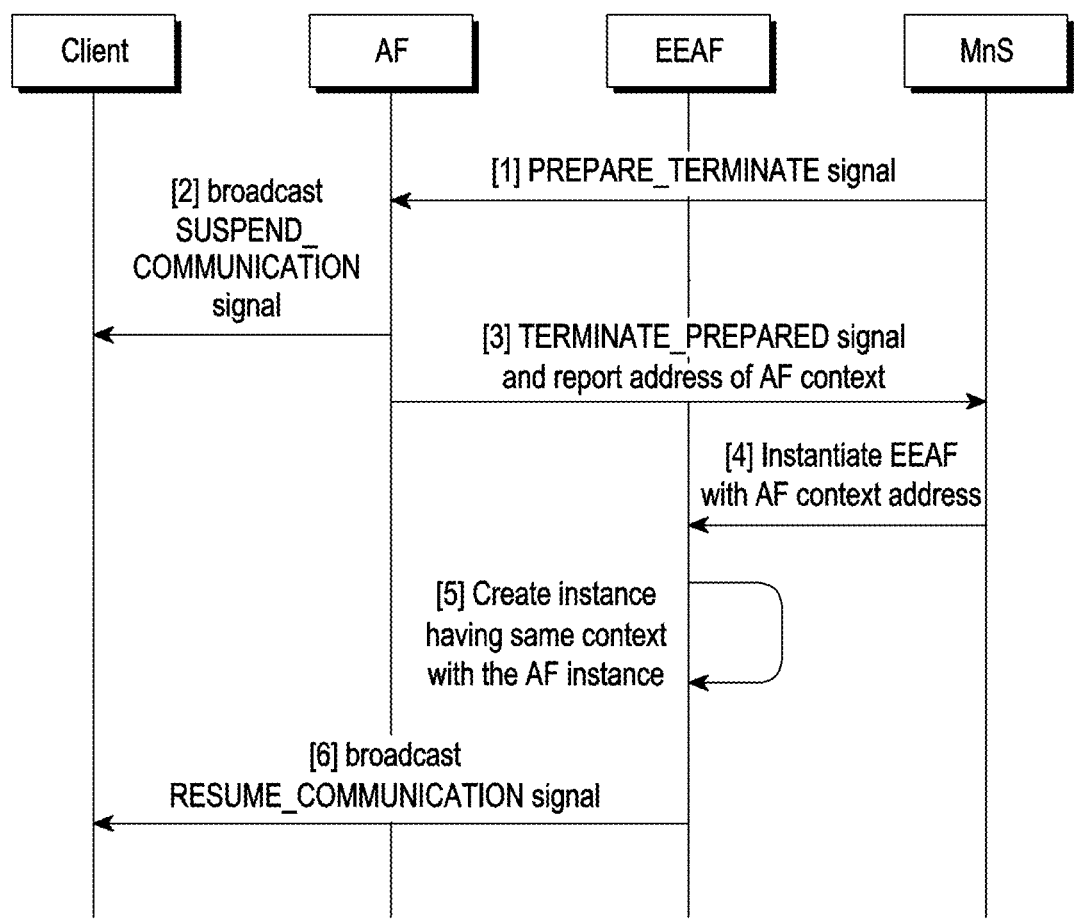
FIG. 8 is a flowchart illustrating a process of terminating an AF and executing an EEAF instance according to an embodiment of the present disclosure.

FIG. 8 is a flowchart illustrating a process of terminating an AF and executing an EEAF instance according to an embodiment of the present disclosure.

According to an embodiment of the disclosure, the MnS may terminate an AF and run an EEAF instance. Referring to FIG. 8, in operation [1], the MnS may transmit a PREPARE TERMINATE signal to the AF, thereby to prepare for the termination of the AF.

In operation [2], since the AF instance has received an instruction to prepare for the termination from the MnS, the AF instance may transmit, to the client, a SUSPEND_COM- MUNICATION signal for suspending communication to prevent the status update of the AF instance itself according to additional communication from all other connected entities.

In operation [3], the AF instance may transmit, to the MnS, information on other connected entities together with the TERMINATE_PREPARED signal, or an address (e.g., address of AF context) in which the information is stored. In operation [4], the MnS may transmit AF information (e.g., AF context address) while instructing the EEAF entity to create a new instance. In operation [5], an EEAF instance supporting functions of both the AF and the EES may be created. In operation [6], the EEAF instance may send a RESUME_COMMUNICATION signal to the clients or entities connected with the existing AF, to resume communication and operate similarly to the existing AF.

Figure 9:
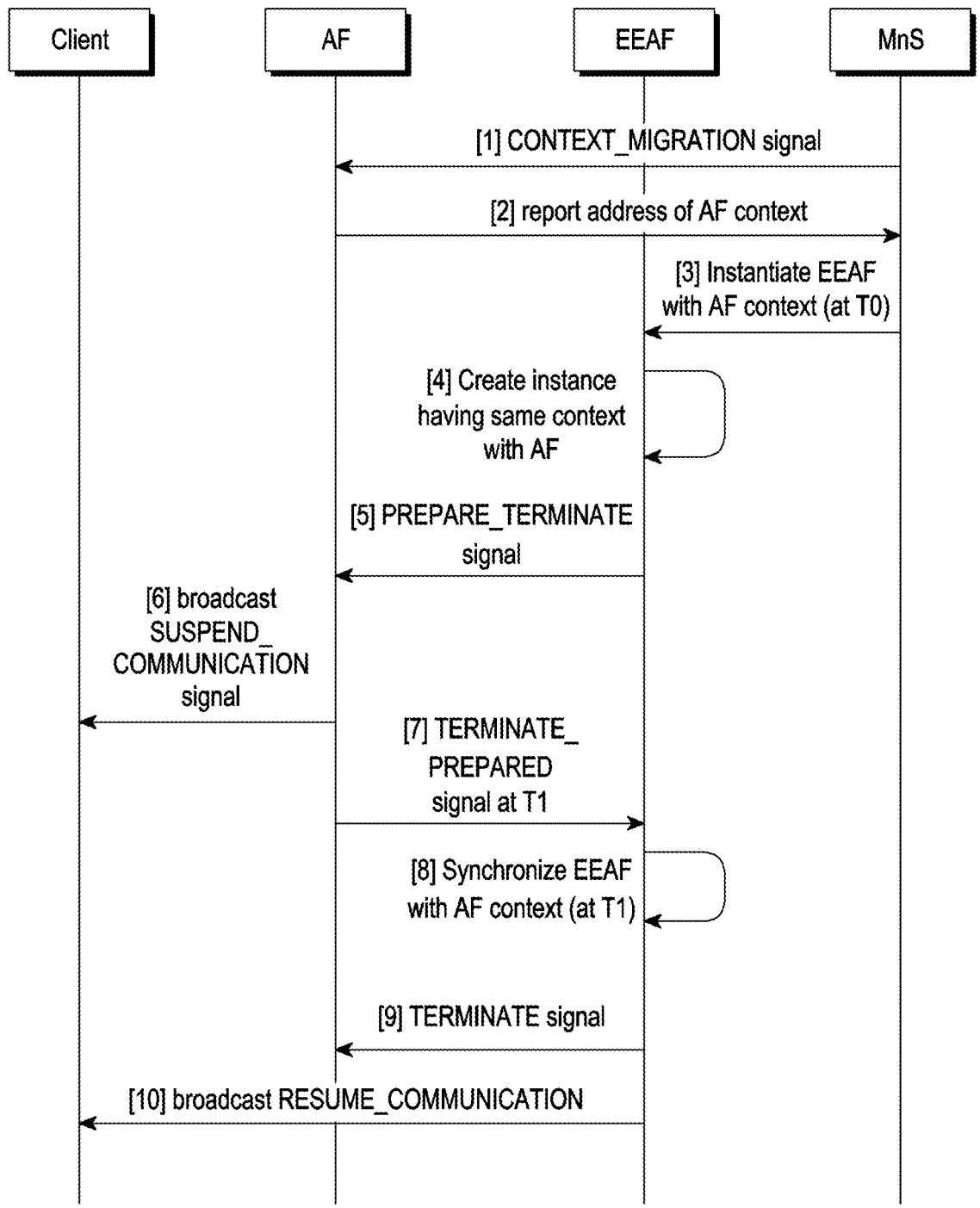
FIG. 9 is a flowchart illustrating a process of terminating an AF and executing an EEAF instance according to another embodiment of the present disclosure.

FIG. 9 is a flowchart illustrating a process of terminating an AF and executing an EEAF instance according to another embodiment of the present disclosure.

FIG. 9 illustrates a process in which the MnS terminates an AF and executes an EEAF instance according to another embodiment of the disclosure. In operation [1], the MnS may transmit a CONTEXT_MIGRATION signal to the AF to request information associated with all other connected entities, or an address in which the information is stored. In operation [2], the MnS may receive, from the AF, information associated with other entities, or an address (e.g., address of AF context) in which the information is stored.

In operations [3] and [4], the MnS may create an instance of the EEAF based on information valid at time T0. In operation [5], the created EEAF instance may transmit a PREPARE TERMINATE signal to an AF having the same endpoint in the system. In operation [6], the AF may send a termination signal (SUSPEND_COMMUNICATION signal) to a client or entity, and in operation [7], the AF may complete preparation for termination at time T1, and transmit a TERMINATE_PREPARED signal to the EEAF. In operation [8], the EEAF may synchronize or match the EEAF's own information with the final information on the AF at the time T1 (synchronize EEAF with AF context). Thereafter, in operation [9], the EEAF may send a TERMINATE signal to the AF to terminate the AF, and in operation [10], the EEAF may broadcast or announce resumption of the communication to the clients, or entities connected to the AF (RESUME_COMMUNICATION). When the time required to create the EEAF varies depending on the timing or takes a relatively long time, the method of FIG. 9 rather than FIG. 8 may provide an effect of limiting the lock down time of the entities connected to the AF, to (T1−T0).

Figure 10:
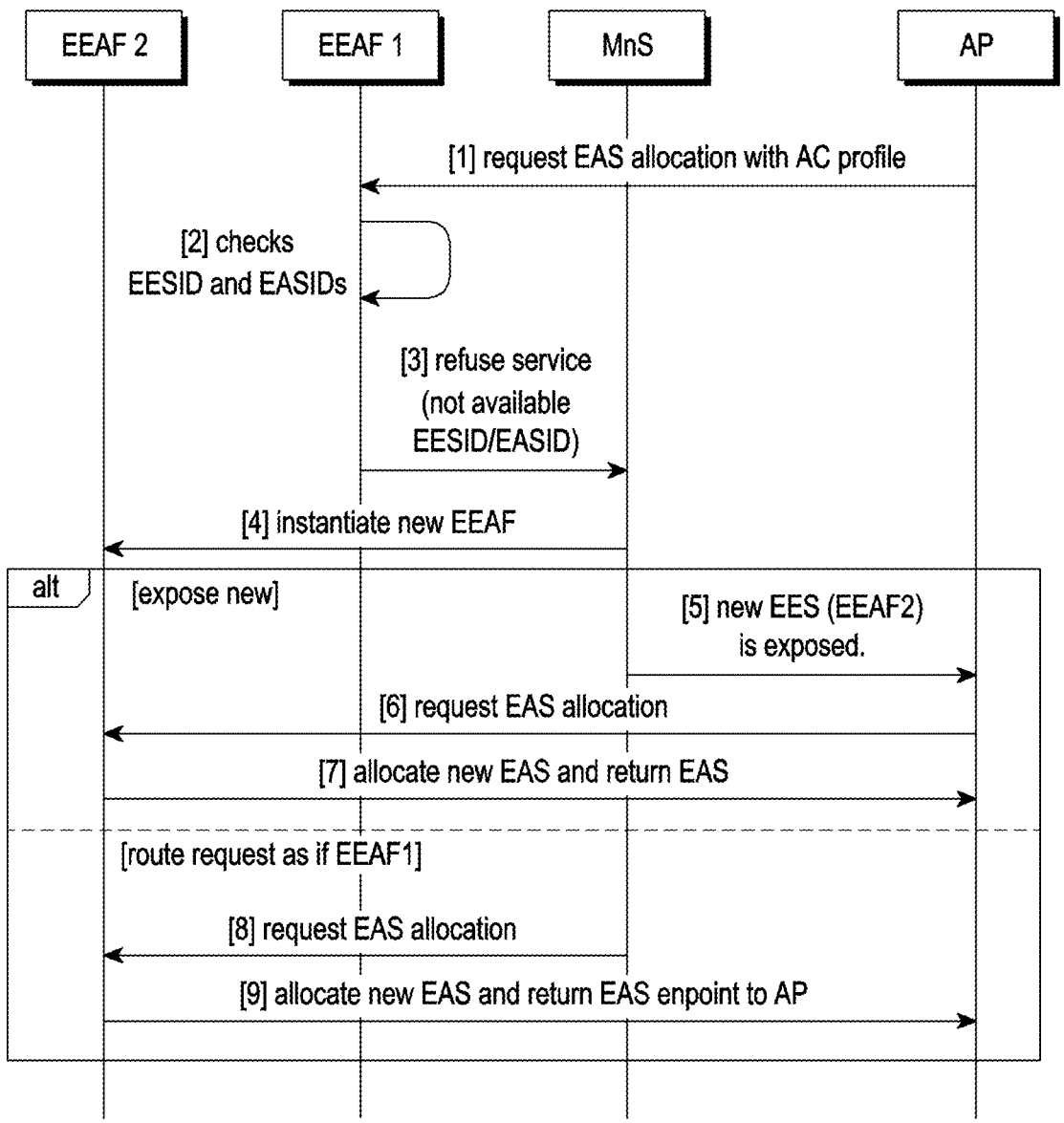
FIG. 10 is a flowchart illustrating a process of creating a new instance according to an embodiment of the present disclosure.

FIG. 10 is a flowchart illustrating a process of creating a new instance according to an embodiment of the present disclosure.

Referring to FIG. 10, the MnS corresponding to an embodiment of the disclosure may determine whether for an instance that is already running, the corresponding instance supports a new requirement, or may determine whether the corresponding instance supports the increased requirements. According to an embodiment, if it is determined that the corresponding instance does not support the new requirement or is insufficient to support the increased requirements, a new instance may be created. FIG. 10 shows a detailed process of creating a new instance that provides an additional function.

Referring to FIG. 10, in operation [1], the AP may transmit a requirement (request EAS allocation with AC profile) for allocating an ESA to a first EEAF instance (hereinafter, EEAF1). In operation [2], the EEAF1 may identify the type of media processing supported by the EES and the type of media processing supported by the EAS. The requirements of the AP according to the edge architecture may be specified using parameters such as AC profile and AC service key performance indicator (KPI), and the EES may identify capacity and supportable specific applications by reviewing EAS profile, EAS ID, EAS type, etc. In operation [3], if there is no EAS supporting the requested media processing among the EASs managed by the EEAF1 (not available ESSID/EASID), the EEAF1 may report "no EAS supporting" to the MnS (refuse service).

In operation [4], the MnS may create a second EEAF instance (hereinafter, EEAF2), which is a new EEAF instance for processing the AP's requirements. According to an embodiment, in operation [5], the MnS may return or deliver an endpoint of the new EEAF2 to the AP. In operation [6], the AP may request EAS allocation again from the EEAF2 (request EAS allocation), and in operation [7], the AP may be allocated a new EAS from the EEAF2.

According to another embodiment, in operation [8], the MnS may directly transmit an EAS allocation request from the AP to the EEAF2 to instruct the EEAF2 to allocate an EAS, and in operation [9], the EEAF2 may deliver the EAS allocation result to the AP.

Figure 11:
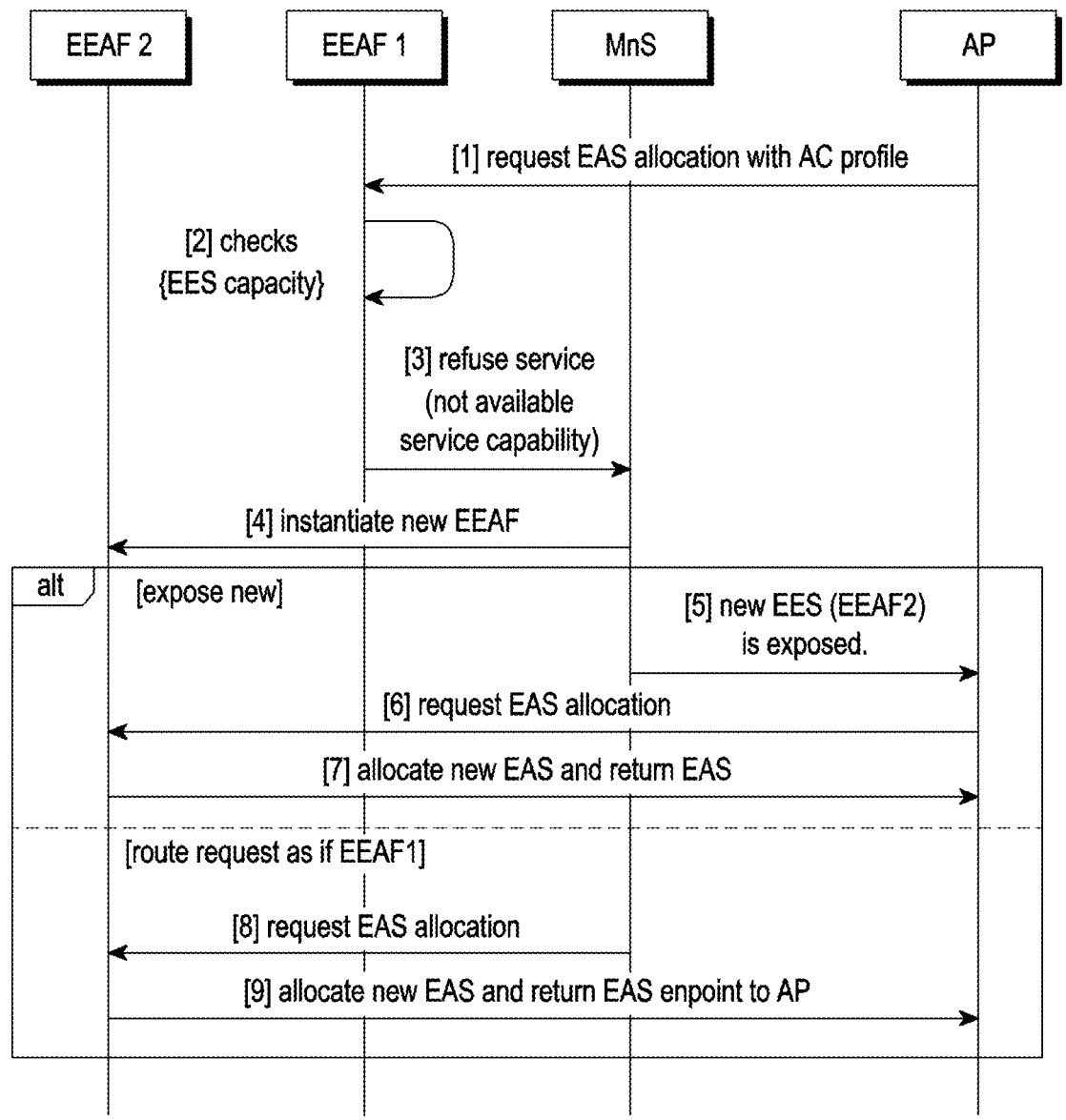
FIG. 11 is a flowchart illustrating a process of creating a new instance according to another embodiment of the present disclosure.

FIG. 11 is a flowchart illustrating a process of creating a new instance according to another embodiment of the present disclosure.

Operations [1] and [5] to [9] shown in FIG. 11 are substantially the same as operations [1] and [5] to [9] shown in FIG. 10, so a description thereof will be omitted.

Referring to FIG. 11, in operation [2], the EEAF1 may identify EES capacity. In operation [3], if there is no available service capacity managed by the EEAF1 (not available service capacity), the EEAF1 may report "no available service capacity" to the MnS (refuse service). In operation [4], the MnS may create a second EEAF instance (hereinafter, EEAF2) that is a new EEAF instance providing additional capability.

Figure 12:
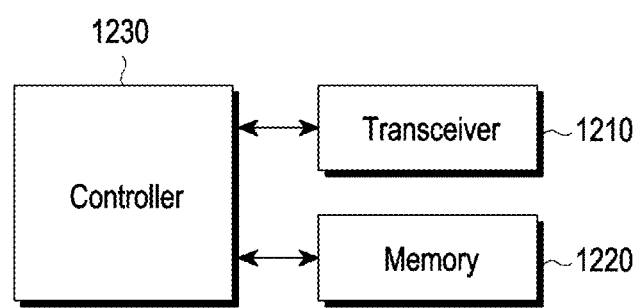
FIG. 12 is a block diagram illustrating a structure of a network device according to an embodiment of the present disclosure.

FIG. 12 is a block diagram illustrating a structure of a network device according to an embodiment of the present disclosure.

Each of the network devices described with reference to FIGS. 1 to 11 may include the configuration of FIG. 12. Here, the network device may be implemented as any one of AF, MnS, AP, Client, EEAF, EEAF1, and EEAF2 shown in FIGS. 1 to 11.

Referring to FIG. 12, a network device according to an embodiment of the disclosure may include a transceiver 1210, a memory 1220, and a controller 1230. The transceiver 1210, the memory 1220, and the controller 1230 of the network device may operate according to the above-described communication method of the network device.

However, the components of the network device are not limited to the above-described examples. For example, the network device may include more or fewer components than the aforementioned components. In addition, the transceiver 1210, the memory 1220, and the controller 1230 may be implemented in the form of a single chip. Also, the controller 1230 may include one or more processors.

The transceiver 1210, which collectively refers to a receiver and a transmitter, may transmit/receive signals to and from other network devices. To this end, the transceiver 1210 may include a radio frequency (RF) transmitter that up-converts a frequency of a signal transmitted and amplifies the up-converted signal, and an RF receiver that low-noise amplifies a received signal and down-converts a frequency thereof. However, this is only an example of the transceiver 1210, and components of the transceiver 1210 are not limited to the RF transmitter and the RF receiver.

Moreover, the transceiver 1210 may receive a signal through a wireless channel and output the signal to the controller 1230, and may transmit the signal output from the controller 1230 through the wireless channel.

The memory 1220 may store programs and data necessary for the operation of the network device. Further, the memory 1220 may store information or data included in a signal obtained from the network device. The memory 1220 may be configured as a storage medium, such as read only memory (ROM), random access memory (RAM), hard disk, compact disc-read only memory (CD-ROM), and digital versatile disc (DVD), or a combination of the storage media. Alternatively, the memory 1220 may be included (or embedded) in the controller 1230, instead of separately existing.

The controller 1230 may control a series of processes so that the network device may operate according to the above-described embodiments of the disclosure. For example, the controller 1230 may receive a control signal and a data signal through the transceiver 1210 and process the received control signal and data signal. Also, the controller 1230 may transmit the processed control signal and data signal through the transceiver 1210. There may be a plurality of controllers 1230, and the controller 1230 may execute a program stored in the memory 1220 to perform a component control operation of the network device.

Methods according to the embodiments described in the claims or specification of the present disclosure may be implemented in the form of hardware, software, or a combination of hardware and software.

When implemented in software, a computer-readable storage medium storing one or more programs (software modules) may be provided. One or more programs stored in the computer-readable storage medium may be configured to be executable by one or more processors in an electronic device. One or more programs may include instructions for causing an electronic device to execute methods according to the embodiments described in the claims or specification of the present disclosure.

Such programs (software modules, software, etc.) may be stored in a RAM, a non-volatile memory including a flash memory, a ROM, an electrically erasable programmable read only memory (EEPROM), a magnetic disc storage device, a CD-ROM, DVDs, any other types of an optical storage device, or a magnetic cassette. Alternatively, the programs may be stored in a memory composed of a combination of some or all of them. In addition, a plurality of the configured memories may be provided.

In addition, the programs may be stored in a communication network such as Internet, Intranet, local area network (LAN), wide LAN (WLAN), or storage area network (SAN); or in an attachable storage device that can be accessed through a communication network composed of a combination thereof. Such a storage device may be connected to a device implementing embodiments of the present disclosure, through an external port. Also, a separate storage device on the communication network may be connected to the device implementing the embodiment of the present disclosure.

In the above-described specific embodiments of the present disclosure, components included in the disclosure are expressed in the singular or plural according to the specific embodiments presented. However, the singular or plural expression is appropriately selected for the context presented for convenience of description, and the present disclosure is not limited to the singular or plural components, and even if a component is expressed in the plural, it is composed of the singular. Even a component expressed in the singular may be composed of a plural.

Although specific embodiments have been described in the detailed description of the present disclosure, many modifications can be made without departing from the scope of the present disclosure. Therefore, the scope of the present disclosure should not be limited to the described embodiments and should be defined by not only the claims described below, but also equivalents thereof.

Although the present disclosure has been described with various embodiments, various changes and modifications may be suggested to one skilled in the art. It is intended that the present disclosure encompass such changes and modifications as fall within the scope of the appended claims.

The invention claimed is:

1. A method for operating a management service (MnS) in a communication system supporting a plurality of architectures, the method comprising:
    identifying an architecture supported by a first instance that is running and a list of functions for the architecture;
    determining whether to use the first instance based on the architecture and a requirement for a service provision initiated by the MnS;
    managing a look up table (LUT) providing, for each endpoint, an instance identifier (ID), at least one process ID corresponding to the instance ID, a list of provided functions, and an entity type; and
    terminating the first instance and generating a second instance based on the LUT in case that the MnS determines not to use the first instance.

2. The method of claim 1, wherein the second instance is a set of processes executing a function providing functionality of a service, and
    wherein the second instance supports one or more architectures.

3. The method of claim 1, further comprising:
    attaching a new process to the first instance in case that the MnS determines to use the first instance; or
    maintaining the first instance and generating the second instance in case that the MnS determines to use the first instance.

4. The method of claim 1, wherein the list of functions for the architecture includes at least one of application function (AF) and edge enabler server (EES).

5. The method of claim 1, further comprising:
    searching, based on an endpoint, the LUT corresponding to the instance ID; and
    identifying a list of supported functions for the instance ID.

6. The method of claim 5, further comprising:
    determining whether to generate an additional instance based on the list of supported functions for the instance ID.

7. The method of claim 1, wherein the architecture supported by the first instance is a media streaming architecture, an edge architecture, or a hybrid system between the media streaming architecture and the edge architecture.

8. The method of claim 1, further comprising:
    receiving, from an AP, an edge architecture function use request (EdgeApp function request).

9. A management service (MnS) device in a communication system supporting a plurality of architectures, the MnS device comprising:
    a transceiver; and a controller comprising one or more processors, the controller coupled with the transceiver and configured to:
  identify an architecture supported by a first instance that is running and a list of functions for the architecture,
  determine whether to use the first instance based on a result of the identification and a requirement for a service provision initiated by the MnS device,
  manage a look up table (LUT) providing, for each endpoint, an instance identifier (ID), at least one process ID corresponding to the instance ID, a list of provided functions, and an entity type, and
  terminate the first instance and generate a second instance based on the LUT in case that the MnS determines not to use the first instance.

10. The MnS device of claim 9, wherein the second instance is a set of processes executing a function providing functionality of a service, and
  wherein the second instance supports one or more architectures.

11. The MnS device of claim 9, wherein the controller is further configured to:
  attach a new process to the first instance in case that the MnS determines to use the first instance; or
  maintain the first instance and generate the second instance in case that the MnS determines to use the first instance.

12. The MnS device of claim 9, wherein the list of functions for the architecture includes at least one of application function (AF) and edge enabler server (EES).

13. The MnS device of claim 9, wherein the controller is further configured to:
  search, based on an endpoint, the LUT corresponding to the instance ID; and
  identify a list of supported functions for the instance ID.

14. The MnS device of claim 13, wherein the controller is further configured to:
  determine whether to generate an additional instance based on the list of supported functions for the instance ID.

15. The MnS device of claim 9, wherein the architecture supported by the first instance is a media streaming architecture, an edge architecture, or a hybrid system between the media streaming architecture and the edge architecture.

16. The Mns device of claim 9, wherein the controller is further configured to:
  receive, from an AP, an edge architecture function use request (EdgeApp function request).

* * * * *